(12) United States Patent
Wu et al.

(10) Patent No.: US 12,309,898 B2
(45) Date of Patent: May 20, 2025

(54) INTERFACE CONTROL CIRCUIT, CONTROL METHOD AND INTERFACE CONTROL DEVICE

(71) Applicant: SHANGHAI BRIGHT POWER SEMICONDUCTOR CO., LTD., Shanghai (CN)

(72) Inventors: Jian Wu, Shanghai (CN); Shunfa Zhang, Shanghai (CN); Zhonghua Sun, Shanghai (CN); Peng Wang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 71 days.

(21) Appl. No.: 18/362,267

(22) Filed: Jul. 31, 2023

(65) Prior Publication Data
US 2024/0365457 A1    Oct. 31, 2024

(30) Foreign Application Priority Data

Apr. 28, 2023 (CN) .......................... 202310487614.6

(51) Int. Cl.
H05B 47/24    (2020.01)
H05B 47/165   (2020.01)

(52) U.S. Cl.
CPC ........... H05B 47/165 (2020.01); H05B 47/24 (2020.01)

(58) Field of Classification Search
CPC ...... H05B 47/18; H05B 47/24; H05B 47/165; H05B 47/175; H05B 47/183
See application file for complete search history.

(56) References Cited

U.S. PATENT DOCUMENTS

| 8,492,983 B1 * | 7/2013 | Berg ...................... H05B 47/18 |
| | | 315/307 |
| 8,664,875 B1 * | 3/2014 | Chang .................... H05B 45/00 |
| | | 315/224 |
| 10,424,364 B1 | 9/2019 | Lin |
| 11,096,253 B1 * | 8/2021 | Mays, II ................ H05B 45/10 |

(Continued)

FOREIGN PATENT DOCUMENTS

| CN | 1456028 A | 11/2003 |
| CN | 101502181 A | 8/2009 |

(Continued)

*Primary Examiner* — Tung X Le
(74) *Attorney, Agent, or Firm* — MUNCY, GEISSLER, OLDS & LOWE, P.C.

(57) ABSTRACT

An interface control circuit, a control method and an interface control device. The interface control circuit is suitable for use in a dimming system compatible with both DALI dimming and push-button dimming. The interface control circuit includes a DALI signal reception control module having a first switch element. The DALI signal reception control module is configured to be enabled, upon a voltage at a power supply terminal of the interface control circuit reaching a pre-start voltage, to turn on or off the first switch element according to the magnitude of a voltage on a DALI bus. The pre-start voltage is lower than a start voltage of the interface control circuit. This invention can ensure accuracy and reliability of rapid communication reestablishment over a period of time from a power-off to the next power-on of the DALI bus.

15 Claims, 4 Drawing Sheets

(56) References Cited

U.S. PATENT DOCUMENTS

| | | | | |
|---|---|---|---|---|
| 2003/0036807 A1* | 2/2003 | Fosler | ............ | H05B 47/18 |
| | | | | 710/110 |
| 2003/0076053 A1 | 4/2003 | Kambara et al. | | |
| 2015/0264759 A1* | 9/2015 | Hatta | ............ | H05B 45/10 |
| | | | | 315/291 |
| 2017/0164453 A1 | 6/2017 | Harbers et al. | | |
| 2017/0231058 A1 | 8/2017 | Sadwick | | |
| 2019/0174591 A1* | 6/2019 | Zhao | ............ | H05B 47/18 |
| 2021/0243862 A1* | 8/2021 | Takacs | ............ | H05B 45/50 |
| 2022/0361308 A1* | 11/2022 | Abbo | ............ | H05B 47/185 |

FOREIGN PATENT DOCUMENTS

| | | |
|---|---|---|
| CN | 102204410 A | 9/2011 |
| CN | 103781227 A | 5/2014 |
| CN | 104600769 A | 5/2015 |
| CN | 104797046 A | 7/2015 |
| CN | 107820355 A | 3/2018 |
| CN | 108289358 A | 7/2018 |
| CN | 108684119 A | 10/2018 |
| CN | 108696971 A | 10/2018 |
| CN | 110521285 A | 11/2019 |
| CN | 112491302 A | 3/2021 |
| CN | 113079609 A | 7/2021 |
| CN | 218679446 U | 3/2023 |
| CN | 115942537 A | 4/2023 |

\* cited by examiner

INTERFACE CONTROL CIRCUIT, CONTROL METHOD AND INTERFACE CONTROL DEVICE

CROSS-REFERENCES TO RELATED APPLICATION

This application claims the priority of Chinese patent application number 2023104876146, filed on Apr. 28, 2023, the entire contents of which are incorporated herein by reference.

TECHNICAL FIELD

The present invention relates to the field of intelligent lighting control technology and, in particular, to an interface control circuit, a control method and an interface control device.

BACKGROUND

Digital addressable lighting interface (DALI) is a lighting standard defined by IEC62386. A DALI bus allows the access of up to 64 control gears (usually controlled lighting devices, such as LED luminaires, relays, etc.) and 64 control devices (usually application controllers and input devices that issue control commands or generate trigger events, such as switches, sensors, etc.) DALI bus not only power the connected devices, but also communicate signals between them. As a wired intelligent lighting technique, DALI buses have been widely used in large venues and commercial and office lighting control systems. In practical use, a control device communicates with a control unit (e.g., a single-chip microcomputer) of a control gear via a DALI bus, and an interface circuit recognizes and receives a DALI signal, converts it to a control signal through optically coupled isolation and transmits the control signal to the control unit. Moreover, the control unit can provide feedback response to the DALI bus by sending a control signal, which is then passed on to the DALI bus via an optocoupler.

However, state-of-the-art interface circuits are generally implemented as discrete components which provide constant-current and constant-limiting functions usually by detecting a voltage across a resistor through VBE of a triode. This approach is disadvantageous in low control accuracy, high susceptibility to temperature drifts, complicated peripheral circuitry, poor consistency and high cost. Although there are some state-of-the-art simple interface circuits consisting of discrete components, such simple interface circuits are often lack of any protective functions. Consequently, when a high voltage is input through push-button dimming, the constant-current triode is always on, leading to significant heat generation. In addition, input overvoltage protection requires the addition of a more complicated detection circuit. Further studies reveal that overvoltage protection circuits of the prior art realize overvoltage protection generally by the use of a Zener diode and the detection of a partial voltage on a resistor through VBE of the triode. Therefore, they also suffer from the problem of low accuracy and high susceptibility to temperature drifts.

Further, an interface circuit consisting of a discrete component is often lack of over-temperature protection. Under an abnormal fault condition, if a DALI bus is pulled down during response of a control unit to the DALI bus, a MOS transistor in the discrete component may always operate in an on-state, possibly causing a temperature rise in the MOS transistor of the discrete component, which may lead to a performance degradation or even damage to the MOS transistor.

It is to be noted that the information disclosed in this background is merely intended to provide a better understanding of the general context of the present invention and should not be taken as an acknowledgement or any form of admission that the information form part of the common general knowledge of those skilled in the art.

SUMMARY OF THE INVENTION

It is an objective of the present invention to overcome one or more of the problems associated with interface control circuits for DALI buses of the prior art, including poor accuracy, high cost and complicated peripheral circuitry by presenting an interface control circuit, a control method and an interface control device. The interface control circuit provided in the present invention is suitable for use in a dimming system compatible with DALI bus dimming and push-button dimming and advantageous in good accuracy, high reliability and simple peripheral circuitry. The control method provided in the present invention enables increased accuracy and reliability of fast communication reestablishment of a DALI bus.

To this end, the present invention lies in an interface control circuit suitable for use in a dimming system compatible with both DALI dimming and push-button dimming, the interface control circuit including a DALI signal reception control module having a first switch element, the DALI signal reception control module configured to be enabled, upon a voltage at a power supply terminal of the interface control circuit reaching a pre-start voltage, to turn on or off the first switch element according to the magnitude of a voltage on a DALI bus, wherein the pre-start voltage is lower than a start voltage of the interface control circuit.

Optionally, the DALI signal reception control module may further include a constant-current source, a pre-start module and an overvoltage and undervoltage protection module, wherein one end of the first switch element is series-connected to the constant-current source and then grounded, and the other end of the first switch element is connected to a signal reception terminal of the interface control circuit, and wherein an input terminal of the pre-start module is connected to the power supply terminal of the interface control circuit, an input terminal of the overvoltage and undervoltage protection module is connected to a voltage detection terminal of the interface control circuit, an output terminal of the pre-start module and an output terminal of the overvoltage and undervoltage protection module connected to each other and then to a control terminal of the first switch element.

Optionally, when a voltage received at the voltage detection terminal of the interface control circuit is higher than an upper voltage threshold or lower than a lower voltage threshold, the overvoltage and undervoltage protection module may turn off the first switch element. When the voltage received at the voltage detection terminal of the interface control circuit lies between the upper voltage threshold and the lower voltage threshold, the overvoltage and undervoltage protection module may turn on the first switch element.

Optionally, the interface control circuit may further include a DALI signal transmitter module, the DALI signal transmitter module including a second switch element, a transmitter logic control module and an overvoltage protection module, one end of the second switch element connected to a drain terminal of the interface control circuit, the other end of the second switch element connected to a current detection terminal of the interface control circuit, an output terminal of the transmitter logic control module and an output terminal of the overvoltage protection module connected to each other and then to a control terminal of the second switch element, an input terminal of the transmitter logic control module connected to a signal transmission terminal of the interface control circuit, an input terminal of the overvoltage protection module and an input terminal of the overvoltage and undervoltage protection module both connected to the voltage detection terminal.

Optionally, the interface control circuit may further include a chip power supply module, a first terminal of the chip power supply module connected to a high-voltage terminal of the interface control circuit, a second terminal of the chip power supply module and the input terminal of the pre-start module connected to each other and then to the power supply terminal of the interface control circuit, the power supply terminal of the interface control circuit series-connected to a capacitor and then grounded.

Optionally, in a period of time from a power-off to the next power-on of the DALI bus, the DALI signal reception control module may be configured to:

at an initial instant of time when the voltage on the DALI bus starts being pulled low from a high level, turn off the first switch element and start discharging the capacitor;

at a first instant of time when the voltage on the DALI bus rises back to the high level, start charging the capacitor and, at a second instant of time when the voltage at the power supply terminal of the interface control circuit reaches or rises above the pre-start voltage, be enabled to turn on the first switch element; and at a third instant of time when the voltage on the DALI bus starts being pulled low from the high level, turn on or off the first switch element according to the magnitude of the voltage on the DALI bus.

Optionally, a time interval between the first and initial instants of time may be 40 ms. Additionally or alternatively, a time interval between the third and first instants of time may be 2.4 ms.

Optionally, the interface control circuit may be integrated into an interface control circuit chip.

To the above end, the present invention also provides a control method for an interface control circuit including the interface control circuit as defined in any of the preceding paragraphs. The control method includes:

when a voltage at the power supply terminal of the interface control circuit reaches a pre-start voltage, enabling the DALI signal reception control module and turning on or off the first switch element according to the magnitude of a voltage on a DALI bus, wherein the pre-start voltage is lower than a start voltage of the interface control circuit.

Optionally, enabling the DALI signal reception control module when the voltage at the power supply terminal of the interface control circuit reaches the pre-start voltage may include:

determining whether the voltage at the power supply terminal of the interface control circuit is equal to or higher than the pre-start voltage and, if so, turning on the first switch element.

Optionally, the control method may further include:

determining whether a voltage at the voltage detection terminal of the interface control circuit is higher than an upper voltage threshold or lower than a lower voltage threshold and, if so, turning off the first switch element.

Optionally, in a period of time from a power-off to the next power-on of the DALI bus, the DALI signal reception control module may operate to perform the steps of:

at an initial instant of time when the voltage on the DALI bus starts being pulled low from a high level, turning off the first switch element and starting discharging a capacitor, wherein the capacitor is series-connected to the power supply terminal of the interface control circuit and then grounded;

at a first instant of time when the voltage on the DALI bus rises back to the high level, starting charging the capacitor and, at a second instant of time when the voltage at the power supply terminal of the interface control circuit reaches or rises above the pre-start voltage, being enabled to turn on the first switch element; and at a third instant of time when the voltage on the DALI bus starts being pulled low from the high level, turning on or off the first switch element according to the magnitude of the voltage on the DALI bus.

Optionally, the voltage on the DALI bus may range from 9.5 V to 22.5 V when at the high level. The voltage on the DALI bus may range from 0 V to 6.5 V when at a low level.

Optionally, a time interval between the first and initial instants of time may be 40 ms. Additionally or alternatively, a time interval between the third and first instants of time may be 2.4 ms.

Optionally, the interface control circuit may further include a DALI signal transmitter module including a second switch element, wherein the control method further includes:

turning on or off the second switch element according to the magnitude of a voltage of a signal received at the DALI signal transmitter module.

To the above end, the present invention also provides an interface control device including a DALI bus, an input surge suppression circuit, a rectification circuit, the interface control circuit as defined in any of the preceding paragraphs, a sampling circuit, a receiver optocoupler and a transmitter optocoupler, the DALI bus connected to an input terminal of the input surge suppression circuit, an output terminal of the suppress surge circuit connected to the rectification circuit, a first output terminal of the rectification circuit connected to each of the sampling circuit, the high-voltage and drain terminals of the interface control circuit and a first input terminal of the receiver optocoupler, the sampling circuit connected to the voltage detection terminal of the interface control circuit, a second input terminal of the receiver optocoupler connected to the signal reception terminal of the interface control circuit, a first output terminal of the transmitter optocoupler connected to the signal transmission terminal of the interface control circuit, a second output terminal of the transmitter optocoupler grounded, a second output terminal of the rectification circuit grounded, an output terminal of the receiver optocoupler and an input terminal of the transmitter optocoupler configured to be connected to a control unit.

Optionally, the interface control device may further include a constant-current circuit, a first terminal of the constant-current circuit connected to the first output terminal of the rectification circuit, a second terminal of the constant-current circuit connected to a third terminal of the constant-current circuit via a resistor, the third terminal of the constant-current circuit connected to the first input terminal of the receiver optocoupler.

Compared with the prior art, the interface control circuit, the control method and the interface control device of the present invention have the advantages as follows:

The interface control circuit is suitable for use in a dimming system compatible with both DALI dimming and push-button dimming and includes a DALI signal reception control module having a first switch element. The DALI signal reception control module is configured to be enabled, upon a voltage at a power supply terminal of the interface control circuit reaching a pre-start voltage, to turn on or off the first switch element according to the magnitude of a voltage on a DALI bus. The pre-start voltage is lower than a start voltage of the interface control circuit. Thus, when the voltage at the power supply terminal of the interface control circuit reaches the pre-start voltage, the DALI signal reception control module is enabled to turn on or off the first switch element according to the magnitude of the DALI bus voltage. This enables rapid communication reestablishment between the DALI bus and the control unit over a period of time from a power-off to the next power-on of the DALI bus, thereby imparting improved accuracy and reliability to the communication between the DALI bus and the control unit and making the device accurate, reliable and simple in peripheral circuitry.

Since the interface control device incorporates the interface control circuit, it has all the advantages of the interface control circuit. Reference can be made to the above description for more details of the advantages of the interface control circuit. In addition, the input surge suppression circuit in the interface control device can suppress a surge that occurs immediately upon the activation of push button dimming, thereby effectively avoiding damage to the rectification circuit, the lighting device and other related devices that may be caused by the surge.

Since the control method is based on the same inventive concept as interface control circuit, it at least has all the advantages of the interface control circuit. Reference can be made to the above description for more details of the benefits of the interface control circuit, and further description thereof is omitted here for the sake of brevity.

Figure 1:
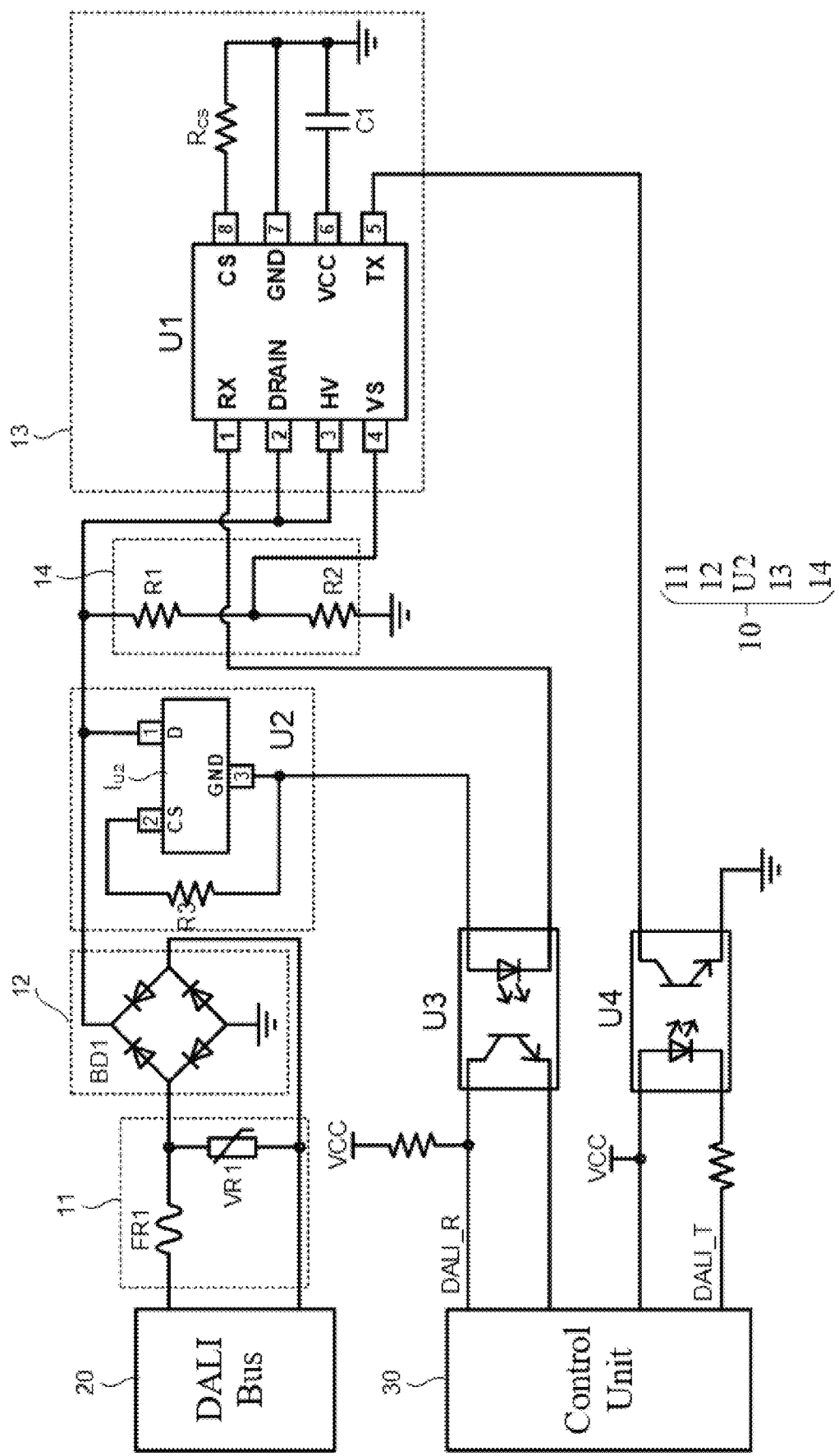
FIG. 1 is a schematic diagram illustrating the structure of an interface control device according to an embodiment of the present invention.

In these figures:
10—interface control device; 11—input surge suppression circuit; FR1—fuse; VR1—varistor; 12—rectification circuit; BD1—rectifier bridge; U1—interface control circuit chip; U2—constant-current circuit; $I_{U2}$—linear constant-current source in the form of a power supply chip;
13—interface control circuit; 131—DALI signal reception control module; S1—first switch element; $I_{RX}$—constant-current source; 1311—pre-start module; 1312—overvoltage and undervoltage protection module; 132—DALI signal transmitter module; S2—second switch element; 1321—transmitter logic control module; 1322—overvoltage protection module; 133—chip power supply module; 1331—voltage regulator circuit; C1—capacitor;
U3—receiver optocoupler; U4—transmitter optocoupler;
14—sampling circuit; R1 and R2—voltage dividing resistors; Rcs—current detector resistor; R3—resistor;
20—DALI bus; 30—control unit.

DETAILED DESCRIPTION

Interface control circuits, control methods and interface control devices proposed in the present invention will be described in greater detail below with reference to the accompanying drawings. From the following description, advantages and features of the present invention will become more apparent. Note that the figures are provided in a very simplified form not necessarily drawn to exact scale and for the only purpose of facilitating easy and clear description of the embodiments disclosed herein. In order that objects, features and advantages of the present invention may become readily apparent, reference is made to the accompanying drawings. It should be noted that architectural, proportional, dimensional and other details in the figures are presented only for the purpose of facilitating, in conjunction with the disclosure herein, the understanding and reading of those familiar with the art rather than being intended to limit conditions under which the present invention can be implemented. Any and all architectural modifications, proportional variations or dimensional changes that do not affect the benefits and objects of the present invention are considered to fall within the scope of the teachings herein. Specific design features of the invention disclosed herein, including, for example, specific dimensions, directions, positions and shapes will be determined in part by the applications and environments where it is to be used. In the embodiments described below, the same reference numerals may be used throughout different figures to denote the same or functionally identical components, while the description thereof will not be repeated. In this specification, like reference numerals and letters refer to like parts. Accordingly, once an item has been defined in a figure, it would be unnecessary to further discuss it in any subsequent figure.

It is to be noted that if a method is described herein as including a series of steps, the order of such steps as presented herein is not necessarily the only order in which such steps may be performed, and certain steps of the stated steps may possibly be omitted and/or certain other steps not described herein may possibly be added to the method. Additionally, the terms "include," "including," or any other variations thereof are intended to cover a non-exclusive inclusion within a process, method, article, or apparatus that includes a list of elements including not only those elements but also those that are not explicitly listed, or other elements that are inherent to such processes, methods, goods, or equipment. In the case of no more limitation, the element defined by the sentence "includes a . . . " does not exclude the existence of another identical element in the process, the method, or the device including the element.

In the description herein, unless clearly specified and defined otherwise, the terms "coupling", "connection" and the like should be interpreted in a broad sense. For example, a connection may be a permanent, detachable or integral connection, a mechanical or electrical connection, a direct or indirect connection with one or more intervening media, or an internal communication or interaction between two elements. Those of ordinary skill in the art can understand the specific meanings of the above-mentioned terms herein, depending on their context.

In order to facilitate the understanding of the present invention, in the following embodiments, an interface control device proposed in the present invention (which includes an interface control circuit proposed in the present invention) will be described first, and description of the interface control circuit and a control method for the interface control circuit proposed in the present invention will follow.

In one embodiment of the present invention, there is provided an interface control device including an interface control circuit of the present invention as defined below. The interface control circuit is suitable for use in a dimming system with DALI bus dimming and push-button dimming. The dimming system includes a push button, a DALI bus, the interface control device, a control unit and a lighting device. AC power is connected to an input terminal of the DALI bus via the push button, or a DALI master is connected to an input terminal of the DALI bus, and the interface control device is connected to the DALI bus and the control unit. The control unit is in turn connected to the lighting device. Specifically, reference is now made to FIG. 1, a schematic diagram illustrating the structure of the interface control device according to this embodiment, and to FIG. 2, a schematic diagram illustrating the structure of an interface control device according to another embodiment. As can be seen from FIG. 1, the interface control device 10 of this embodiment includes an input surge suppression circuit 11, a rectification circuit 12 (e.g., a rectifier bridge BD1), an interface control circuit 13, a sampling circuit 14, a receiver optocoupler U3 and a transmitter optocoupler U4. The DALI bus 20 is connected to an input terminal of the input surge suppression circuit 11, and an output terminal of the input surge suppression circuit 11 is connected to the rectification circuit 12. A first output terminal of the rectification circuit 12 is connected to each of the sampling circuit 14, a high-voltage terminal HV and a drain terminal DRAIN of the interface control circuit 13 and a first input terminal of the receiver optocoupler U3. The sampling circuit 14 is connected to a voltage detection terminal VS of the interface control circuit 13, and a second input terminal of the receiver optocoupler U3 is connected to a signal reception terminal RX of the interface control circuit 13. A first output terminal of the transmitter optocoupler U4 is connected to a signal transmission terminal TX of the interface control circuit 13, and second output terminals respectively of the transmitter optocoupler 14 and the rectification circuit 12 are grounded. An output terminal of the receiver optocoupler U3 and an input terminal of the transmitter optocoupler U4 are both connected to the control unit 30. Specifically, a signal reception pin DALI_R of the control unit 30 (including but not limited to an MCU) is connected to the output terminal of the receiver optocoupler U3, and a signal transmission pin DALI_T of the control unit 30 is connected to the input terminal of the transmitter optocoupler U4.

Specifically, the interface control circuit 13 includes a DALI signal reception control module 131 having a first switch element S1. The DALI signal reception control module 131 is configured to be enabled, upon a voltage at a power supply terminal VCC of the interface control circuit 13 reaching a pre-start voltage, to turn on or off the first switch element S1 according to the magnitude of a DALI bus voltage. The pre-start voltage is lower than a start voltage of the interface control circuit 13.

Thus, the input surge suppression circuit 11 in the interface control device 10 of this embodiment is able to suppress a surge that occurs immediately upon the activation of push button (not labeled) dimming, thereby effectively avoiding damage to related devices of the rectification circuit 12, the interface control circuit 13 and the lighting device that may be caused by the surge. Moreover, in the interface control circuit 13 in the interface control device 10 of this embodiment, the DALI signal reception control module 131 is enabled when the voltage at the power supply terminal VCC reaches the pre-start voltage to turn on or off the first switch element S1 according to the magnitude of the DALI bus voltage. In this way, communication between the DALI bus 20 and the control unit 30 can be rapidly re-established over a period of time from a power-off to the next power-on of the DALI bus 20, thereby imparting improved accuracy and reliability to the communication between the DALI bus 20 and the control unit 30 and making the device accurate, reliable and simple in peripheral circuitry.

Specifically, with continued reference to FIG. 1, the input surge suppression circuit 11 includes a fuse FR1 and a varistor VR1. This can more effectively suppress a surge that occurs immediately upon the activation of push button dimming and thereby more effectively avoid damage to related devices of the rectification circuit 12, the interface control circuit 13 and the lighting device that may be caused by the surge. It is to be noted that, as would be appreciated by those skilled in the art, the structure of the input surge suppression circuit 11 shown in FIG. 1 is merely an example and not intended to limit the present invention in any sense. In alternative embodiments, other circuit structure capable of suppressing a surge known to those skilled in the art can be adopted, including, but not limited to, optical coupling circuits and magnetic coupling circuits, and no detailed exemplification thereof will be given herein.

As an example, as can be seen from FIG. 1, the interface control device 10 of this embodiment further includes a constant-current circuit U2. It is to be noted that, although the constant-current circuit U2 is shown as including a linear constant-current source in the form of a power supply chip $I_{U2}$, the present invention is not so limited. In practical applications, suitable choices can be made to meet their needs. More specifically, a first terminal of the constant-current circuit U2 is connected to the first output terminal of the rectification circuit 12 and is configured to receive a rectified DALI signal, and a second terminal of the constant-current circuit U2 is connected to a third terminal of the constant-current circuit U2 via a resistor R3, the third terminal of the constant-current circuit U2 is connected to the first input terminal of the receiver optocoupler U3. The signal reception terminal RX of the interface control circuit 13 is provided with a built-in constant-current source $I_{RX}$ capable of providing a primary current for driving the receiver optocoupler U3. Connecting the constant-current circuit U2, the input terminal of the receiver optocoupler U3 and the signal reception terminal RX of the interface control circuit 13 in series can further facilitate lightning surge protection.

It is to be noted that, for more details of the interface control circuit 13, reference can be made to the following detailed description of interface control circuit embodiments, and further description thereof will be omitted here for the sake of brevity.

Preferably, the sampling circuit 14 includes series-connected voltage dividing resistors R1 and R2. The other end of the voltage dividing resistor R1 is configured to receive a rectified DALI signal from the rectifier bridge BD1, and the other end of the voltage dividing resistor R2 is grounded. A node between the voltage dividing resistors R1 and R2 is connected to the voltage detection terminal of the interface control circuit 13 (e.g., the VS pin of the interface control circuit chip U1 shown in FIGS. 1 and 2). It is to be noted that the present invention is not limited to any specific parameters of the voltage dividing resistors R1 and R2 (e.g., rated resistance, precision, power, etc.), and in practical applications, suitable choices can be made to meet their needs. It is to be noted that, according to a protocol employed by the DALI bus 20, a DALI bus voltage 20 (prior to rectification) in the range of 9.5 V to 22.5 V is considered as a high level, and a DALI bus voltage 20 (prior to rectification) in the range of 0 V to 6.5 V is considered as a low level. Accordingly, when a high level is present on the DALI bus 20, it is necessary to ensure that there is a voltage higher than 0.5 V to 3 V at the voltage detection terminal of the interface control circuit 13 (e.g., the VS pin of the interface control circuit chip U1 shown in FIGS. 1 and 2). Moreover, when a low level is present on the DALI bus 20, it is necessary to ensure that there is a voltage lower than 0.5 V at the voltage detection terminal of the interface control circuit 13.

An interface control circuit provided in another embodiment of the present invention will be detailed below.

Figure 2:
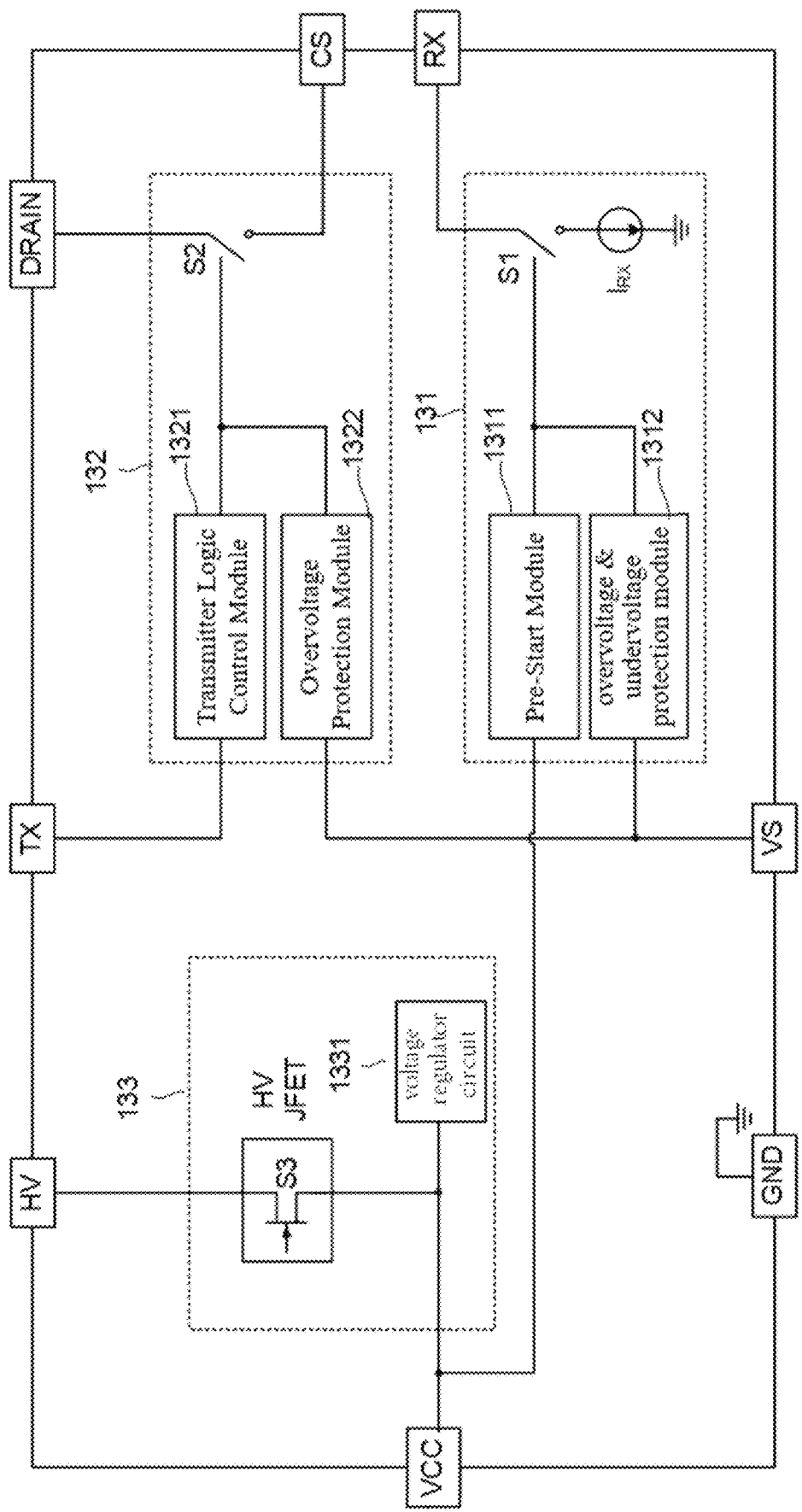
FIG. 2 is a schematic diagram illustrating the structure of an interface control circuit according to another embodiment of the present invention.

Particular reference is now made to FIG. 2. As can be seen from this figure, the interface control circuit 13 of this embodiment includes a DALI signal reception control module 131 having a first switch element S1. The DALI signal reception control module 131 is configured to be enabled, upon a voltage at a power supply terminal VCC of the interface control circuit 13 reaching a pre-start voltage, to turn on or off the first switch element S1 according to the magnitude of a DALI bus voltage, thereby achieving fast communication. The pre-start voltage is lower than a start voltage of the interface control circuit 13.

With this configuration, in the interface control circuit 13 of this embodiment, the DALI signal reception control module 131 is enabled when the voltage at the power supply terminal VCC reaches the pre-start voltage to turn on or off the first switch element S1 according to the magnitude of the DALI bus voltage. In this way, communication between the DALI bus 20 and the control unit 30 can be rapidly re-established over a period of time from a power-off to the next power-on of the DALI bus 20, thereby imparting improved accuracy and reliability to the communication between the DALI bus 20 and the control unit 30 and making the device accurate, reliable and simple in peripheral circuitry.

With continued reference to FIG. 1, preferably, in some exemplary embodiments, the interface control circuit 13 is integrated into an interface control circuit chip U1. Specifically, an output terminal of the sampling circuit 14 is connected to a voltage detection terminal of the interface control circuit 13 (e.g., the VS pin of the interface control circuit chip U1 shown in FIGS. 1 and 2), and a DALI signal that has been rectified by the rectifier bridge BD1 is connected to a drain terminal (e.g., the DRAIN pin of the interface control circuit chip U1 shown in FIGS. 1 and 2) and a high-voltage terminal (e.g., the HV pin of the interface control circuit chip U1 shown in FIGS. 1 and 2) of the interface control circuit 13. As shown in FIG. 1, preferably, the sampling circuit 14 is arranged outside of the interface control circuit chip U1. It is to be noted that the present invention is not so limited, as would be appreciated by those skilled in the art. In some other embodiments, the sampling circuit 14 may be integrated in the interface control circuit chip U1.

Preferably, in some exemplary embodiments, with continued reference to FIG. 2, the DALI signal reception control module 131 further includes a constant-current source $I_{RX}$, a pre-start module 1311 and an overvoltage and undervoltage protection module 1312. Specifically, one end of the first switch element S1 is series-connected to the constant-current source $I_{RX}$ and then grounded, and the other end of the first switch element S1 is connected to a signal reception terminal of the interface control circuit 13 (e.g., the RX pin of the interface control circuit chip U1 shown in FIGS. 1 and 2). An input terminal of the pre-start module 1311 is connected to the power supply terminal of the interface control circuit 13 (e.g., the VCC pin of the interface control circuit chip U1 shown in FIGS. 1 and 2), and an input terminal of the overvoltage and undervoltage protection module 1312 is connected to the voltage detection terminal of the interface control circuit 13 (e.g., the VS pin of the interface control circuit chip U1 shown in FIGS. 1 and 2). An output terminal of the pre-start module 1311 is connected to an output terminal of the overvoltage and undervoltage protection module 1312 at a node to which a control terminal (not labeled) of the first switch element S1 is connected.

As an example, the first switch element S1 is turned on or off under the control of the pre-start module 1311 or the overvoltage and undervoltage protection module 1312. When the voltage at the power supply terminal of the interface control circuit 13 (e.g., the VCC pin of the interface control circuit chip U1 shown in FIGS. 1 and 2) is lower than the pre-start voltage, the first switch element S1 is turned off under the control of the pre-start module 1311. When the voltage at the power supply terminal of the interface control circuit 13 (e.g., the VCC pin of the interface control circuit chip U1 shown in FIGS. 1 and 2) reaches the pre-start voltage, the first switch element S1 is turned on or off under the control of the overvoltage and undervoltage protection module 1312.

Preferably, in one exemplary embodiment, when a voltage received at the voltage detection terminal of the interface control circuit 13 is higher than an upper voltage threshold or lower than a lower voltage threshold, the first switch element S1 is turned off under the control of the overvoltage and undervoltage protection module 1312. When the voltage received at the voltage detection terminal of the interface control circuit 13 lies between the upper voltage threshold and the lower voltage threshold, the first switch element S1 is turned on under the control of the overvoltage and undervoltage protection module 1312. With this configuration, in addition to ensuring that communication between the DALI bus 20 and the control unit 30 can be rapidly re-established over a period of time from a power-off to the next power-on of the DALI bus 20, thereby imparting improved accuracy and reliability to the communication of the DALI bus 20, the interface control circuit 13 of this embodiment can provide overvoltage and undervoltage protection. In this way, it can provide comprehensive protection functions (including input overvoltage protection, chip overtemperature protection and the like for the DALI bus 20). Further, in order to be compatible with high-voltage resistance required by push-button dimming, the trigger point for input overvoltage protection can be precisely set so that the first switch element S1 remains OFF even when a high voltage is input, thereby avoiding the problem of undesired heat generation by the constant-current source $I_{RX}$ if the push button were always ON.

With continued reference to FIG. 2, preferably, in some exemplary embodiments, the interface control circuit 13 further includes a DALI signal transmitter module 132 including a second switch element S2, a transmitter logic control module 1321 and an overvoltage protection module 1322. Specifically, one end of the second switch element S2 is connected to the drain terminal of the interface control circuit 13 (e.g., the DRAIN pin of the interface control circuit chip U1 shown in FIGS. 1 and 2), and the other end of the second switch element S2 is connected to a current detection terminal of the interface control circuit 13 (e.g., the CS pin of the interface control circuit chip U1 shown in FIGS. 1 and 2). An output terminal of the transmitter logic control module 1321 and an output terminal of the overvoltage protection module 1322 are connected to each other at a node to which a control terminal (not labeled) of the second switch element S2 is connected. An input terminal of the transmitter logic control module 1321 is connected to a signal transmission terminal of the interface control circuit 13 (e.g., the TX pin of the interface control circuit chip U1 shown in FIGS. 1 and 2). An input terminal of the overvoltage protection module 1322 and the input terminal of the overvoltage and undervoltage protection module 1312 are both connected to the voltage detection terminal of the interface control circuit 13 (e.g., the VS pin of the interface control circuit chip U1 shown in FIGS. 1 and 2).

As an example, the second switch element S2 is turned on or off under the control of both the transmitter logic control module 1321 and the overvoltage protection module 1322. When a voltage at the signal transmission terminal of the interface control circuit 13 (e.g., the TX pin of the interface control circuit chip U1 shown in FIGS. 1 and 2) is a high level, the second switch element S2 is turned off. When the voltage at the signal transmission terminal of the interface control circuit 13 (e.g., the TX pin of the interface control circuit chip U1 shown in FIGS. 1 and 2) is a low level, the second switch element S2 is turned on. With this configuration, in addition to being able to ensure that the control unit 30 can transmit a feedback signal to the DALI bus 20, the interface control circuit 13 of the present invention has comprehensive protection functions as the overvoltage protection module 1322 additionally provides overvoltage protection. More specifically, the current detection terminal CS of the interface control circuit 13 is series-connected to a current detector resistor $R_{CS}$ and then ground. In this way, a maximum pull-down current for the DALI bus voltage can be configured by appropriately setting resistance of the current detector resistor $R_{CS}$.

Preferably, in some exemplary embodiments, the interface control circuit 13 further includes a chip power supply module 133 having a first terminal connected to the high-voltage terminal of the interface control circuit 13 (e.g., the HV pin of the interface control circuit chip U1 shown in FIGS. 1 and 2). A second terminal of the chip power supply module 133 is connected to the input terminal of the pre-start module 1311, and both are then connected to the power supply terminal of the interface control circuit 13 (e.g., the VCC pin of the interface control circuit chip U1 shown in FIGS. 1 and 2). Moreover, the power supply terminal VCC of the interface control circuit 13 is series-connected to a capacitor C1 and then grounded. As such, the interface control device 10 of the present invention is able to charge the capacitor C1 when the DALI bus voltage is a high level, providing for rapid re-establishment of communication with the control unit 30 over a period of time from a power-off to the next power-on of the DALI bus. Specifically, the chip power supply module 133 includes a high-voltage circuit JFET and a voltage regulator circuit 1331, which can render the interface control circuit 13 even more stable and reliable.

A process of transmitting a DALI signal in the interface control circuit 13 of the present invention is briefed below.

First of all, the DALI signal from the DALI bus 20 is delivered to the control unit 30. When the DALI bus voltage is a high level (9.5-22.5 V), the first switch element S1 is turned on. Otherwise, when the DALI bus voltage is a low level (0-6.5 V), the first switch element S1 is turned off, allowing the DALI signal to be received. More specifically, the interface control circuit chip U1 detects the rectified DALI signal received at the VS pin using the sampling circuit 14 and turns on or off the constant-current source $I_{RX}$ built in the RX pin of the interface control circuit chip U1, depending whether the DALI bus voltage is a high or low level. When the DALI bus voltage is a high level (9.5-22.5 V), the first switch element S1 is turned on, and hence the constant-current source $I_{RX}$ and both primary and secondary stages of the receiver optocoupler U3 are turned on. As a result, a low-level voltage is present at the signal reception pin DALI_R of the control unit 30. When the DALI bus voltage is a low level (0-6.5 V), the first switch element S1 is turned off, and hence the constant-current source $I_{RX}$ and both the primary and secondary stages of the receiver optocoupler U3 are turned off. As a result, the voltage at the signal reception pin DALI_R of the control unit 30 is pulled to a high level. In this way, the high or low level on the DALI bus 20 is isolated by the receiver optocoupler U3 and transmitted to the signal reception pin DALI_R of the control unit 30. After parsing the received DALI signal, the control unit 30 issues a control signal from its signal transmission pin DALI_T, which is then isolated by the transmitter optocoupler U4 and transmitted to the signal transmission terminal of the interface control circuit 13 (e.g., the TX pin of the interface control circuit chip U1 shown in FIGS. 1 and 2). When the signal from the signal transmission pin DALI_T of the control unit 30 is a high level, both primary and secondary stages of the transmitter optocoupler U4 are turned off, and a high level is present at the signal transmission terminal of the interface control circuit 13. Moreover, the second switch element S2 is turned off, and the DALI bus voltage is maintained high. When the signal from the signal transmission pin DALI_T of the control unit 30 is a low level, both the primary and secondary stages of the transmitter optocoupler U4 are turned on, and a low level is present at the signal transmission terminal of the interface control circuit 13. Moreover, the second switch element S2 is turned on, and the DALI bus voltage is pulled low. In this way, the feedback signal from the control unit 30 can be transmitted to the DALI bus 20.

Preferably, in some exemplary embodiments, in a period of time from a power-off to the next power-on of the DALI bus, the DALI signal reception control module is configured to:

at an initial instant of time when the DALI bus voltage starts being pulled low from a high level, turn off the first switch element and start discharging the capacitor;

at a first instant of time when the DALI bus voltage rises back to the high level, start charging the capacitor and, at a second instant of time when the voltage at the power supply terminal of the interface control circuit reaches or rises above the pre-start voltage, be enabled to turn on the first switch element; and at a third instant of time when the DALI bus voltage starts being pulled low from the high level, turn on or off the first switch element according to the magnitude of the DALI bus voltage.

Specifically, the time interval between the first and initial instants of time is 40 ms, and/or the time interval between the third and first instants of time is 2.4 ms.

In this way, the interface control circuit 13 of this embodiment enables the control unit 30 to receive the DALI signal as early as when the voltage at the power supply terminal of the interface control circuit 13 reaches the pre-start voltage. As such, communication can be rapidly re-established (e.g., within 100 ms) after the DALI bus 20 is powered up at relatively small capacitance of the capacitor C1 that is connected in series with the power supply terminal of the interface control circuit 13 (e.g., the VCC pin of the interface control circuit chip U1 shown in FIGS. 1 and 2), ensuring fast communication reestablishment with high accuracy and reliability over a period of time from a power-off to the next power-on of the DALI bus. It is to be noted that, although capacitor C1 is shown as being arranged outside of the interface control circuit chip U1, the present invention is not so limited, because in some other embodiments, the capacitor C1 may be alternatively integrated in the interface control circuit chip U1.

For more details of how the first switch element S1 is turned on and off under the control of the DALI signal reception control module 131 during a period of time from a power-off to the next power-on of the DALI bus, reference can be made to the following detail description of the control method of the present invention for an interface control circuit, and further description thereof will be omitted here.

In a further embodiment of the present invention, there is provided a control method for an interface control circuit including the interface control circuit 13 according to any of the above embodiments. The control method is detailed below.

Upon the voltage at the power supply terminal of the interface control circuit 13 reaching the pre-start voltage, the DALI signal reception control module 131 is enabled to turn on or off the first switch element S1 according to the magnitude of the DALI bus voltage. The pre-start voltage is lower than the start voltage of the interface control circuit 13.

With this configuration, in the control method of this embodiment, the DALI signal reception control module 131 is enabled when the voltage at the power supply terminal of the interface control circuit 13 reaches the pre-start voltage to turn on or off the first switch element S1 in the interface control circuit 13 according to the magnitude of the DALI bus voltage. This enables the control unit 30 to receive a DALI signal upon the voltage at the power supply terminal of the interface control circuit 13 reaching the pre-start voltage, thus ensuring rapid reestablishment of communication with the control unit 30 over a period of time from a power-off to the next power-on of the DALI bus and imparting increased accuracy and reliability to communication of the DALI bus 20.

It is to be noted that reference can be made to the description of FIGS. 1 and 2 and the foregoing embodiments for details of the interface control circuit 13, and further description thereof will be omitted here for the sake of brevity.

Preferably, in one exemplary embodiment, the enabling of the DALI signal reception control module upon the voltage at the power supply terminal of the interface control circuit reaching the pre-start voltage includes:

determining whether the voltage at the power supply terminal of the interface control circuit 13 reaches or exceeds the pre-start voltage and, if so, turning on the first switch element S1.

Preferably, in one exemplary embodiment, the control method further includes:

determining whether a voltage at the voltage detection terminal of the interface control circuit 13 is higher than an upper voltage threshold or lower than a lower voltage threshold and, if so, turning off the first switch element S1.

With this configuration, the control method for the interface control circuit 13 provided in this embodiment not only ensures that the DALI bus 20 can rapidly communicate with the control unit 30 again over a period of time from a power-off to the next power-on of the DALI bus but also imparts increases accuracy and reliability to communication of the DALI bus 20. Moreover, overvoltage and undervoltage protection can be provided. Thus, comprehensive protection functions (including input overvoltage protection, chip over-temperature protection and the like for the DALI bus 20) can be achieved. Further, in order to be compatible with high-voltage resistance required by push-button dimming, the trigger point for input overvoltage protection can be precisely set so that the first switch element S1 remains OFF even when a high voltage is input, thereby avoiding the problem of undesired heat generation by the constant-current source $I_{RX}$ if the push button were always ON.

It is to be noted that the pre-start voltage, the start voltage, the upper voltage threshold and the lower voltage threshold are all fixed thresholds configured in a chip, and the present invention is not limited to any particular values of these fixed thresholds. In particular applications, they can be appropriately configured as actually needed. In addition, as would be appreciated by those skilled in the art, in some other embodiments, the pre-start voltage, the start voltage, the upper voltage threshold and the lower voltage threshold configured in the chip (e.g., the interface control circuit chip) may be modified by controlling software or hardware. However, the present invention is not limited to whether or not these thresholds configured in the chip can be modified by controlling software or hardware.

Figure 3:
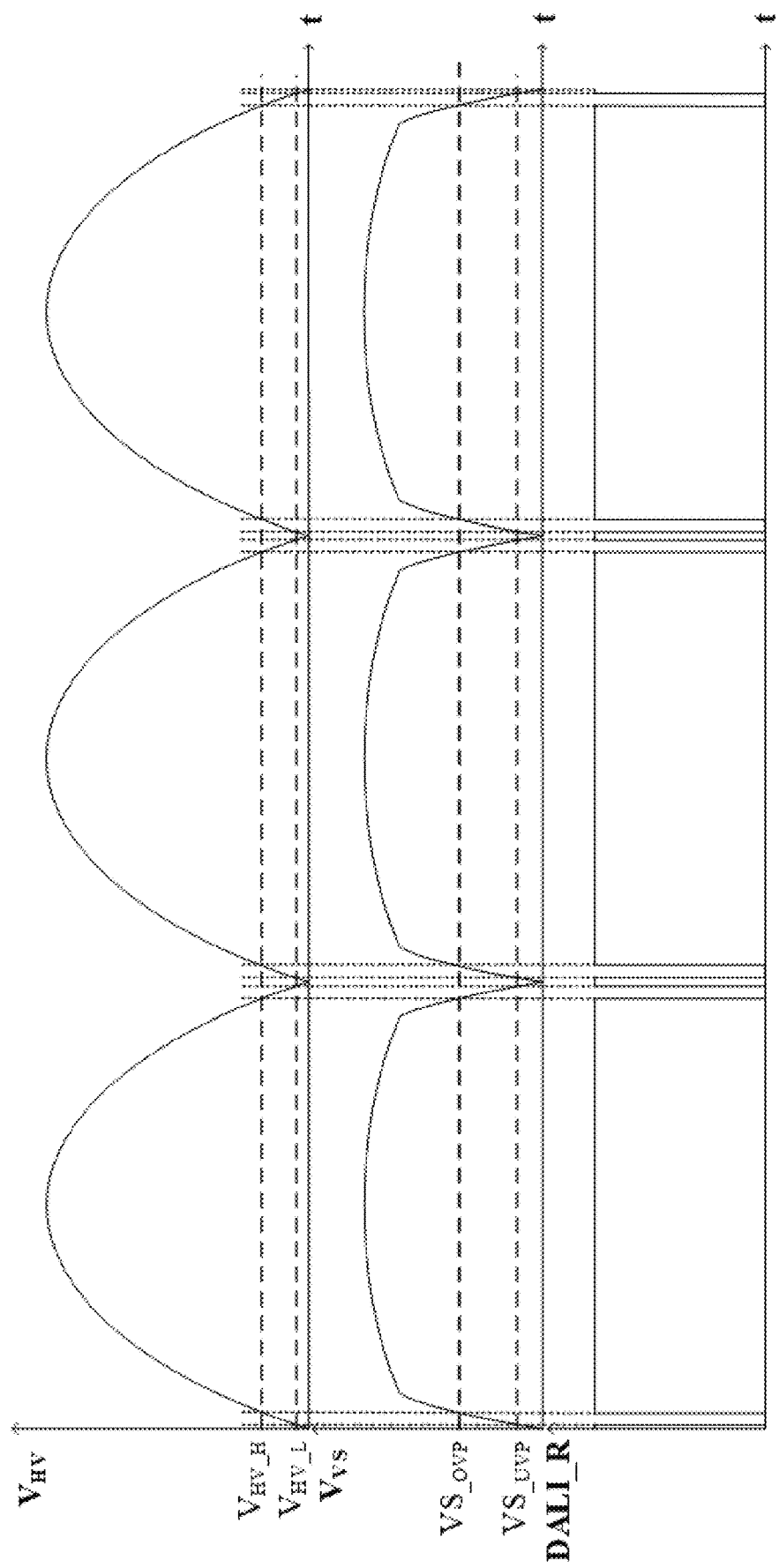
FIG. 3 shows exemplary waveforms involved in push-button dimming operation in a control method for an interface control circuit according to the present invention.

As an example, reference is now made to FIG. 3, a diagram showing exemplary waveforms involved in push-button dimming operation in the control method of the present invention. Preferably, for a better understanding of the present invention, reference is also made to FIGS. 1 and 2. Specifically, in a push-button dimming mode, after a normally open switch is closed, AC power AC (e.g., mains power) is connected to the input terminal of the DALI bus 20 and rectified. As a result, a 100 Hz full wave rectified sine wave is received at the high-voltage terminal of the interface control circuit 13 (e.g., the HV pin of the interface control circuit chip U1 shown in FIGS. 1 and 2) (in FIG. 3, $V_{HV}$ denotes the voltage at the high-voltage terminal; $H_{HV\_H}$ denotes DALI bus voltage value corresponding to the upper voltage threshold $VS_{\_OVP}$; and $H_{HV\_L}$ denotes DALI bus voltage value corresponding to the lower voltage threshold $VS_{\_UVP}$). Additionally, as a result of a voltage-dividing action performed by the voltage dividing resistors R1 and R2, a 100 Hz wave voltage $V_{VS}$ can be detected at the voltage detection terminal of the interface control circuit 13 (e.g., the VS pin of the interface control circuit chip U1 shown in FIGS. 1 and 2) can be detected. When the voltage $V_{VS}$ at the voltage detection terminal is higher than the upper voltage threshold $VS_{\_OVP}$ or lower than the lower voltage threshold $VS_{\_UVP}$, the first switch element S1 in the DALI signal reception control module 131 is turned off, and a high level is present at the signal reception pin DALI_R of the control unit 30. When the voltage $V_{VS}$ at the voltage detection terminal lies between the upper voltage threshold $VS_{\_OVP}$ and the lower voltage threshold $VS_{\_UVP}$, the first switch element S1 in the DALI signal reception control module 131 is turned on, and a low level is present at the signal reception pin DALI_R of the control unit 30. In this way, signal transmission to the control unit 30 is achieved in the push-button dimming mode. Through parsing the received DALI signal, the control unit 30 can determine whether the push button has been manipulated by a long press or a short press and output a corresponding PWM dimming signal for performing an intended push-button dimming function.

Preferably, in one exemplary embodiment, in a period of time from a power-off to the next power-on of the DALI bus 20, the DALI signal reception control module 131 operates as follows:

At an initial instant of time when the DALI bus voltage starts being pulled low from a high level, it turns off the first switch element S1, starting discharging the capacitor C1 that is series-connected to the power supply terminal of the interface control circuit 13 and then grounded.

At a first instant of time when the DALI bus voltage rises back to the high level, it starts charging the capacitor C1. Moreover, at a second instant of time when the voltage at the power supply terminal of the interface control circuit reaches or rises above the pre-start voltage, it is enabled to turn on the first switch element S1.

At a third instant of time when the DALI bus voltage starts being pulled low from the high level, it turns on or off the first switch element S1 according to the magnitude of the DALI bus voltage.

With this configuration, in the control method for the interface control circuit 131 provided in this embodiment, the first switch element S1 is turned on or off according to the magnitude of the DALI bus voltage, allowing the control unit 30 to receive the DALI signal as early as when the voltage at the power supply terminal of the interface control circuit 13 reaches the pre-start voltage. As such, communication can be rapidly re-established (e.g., within 100 ms) after the DALI bus 20 is powered up at relatively small capacitance of the capacitor C1 that is connected in series with the power supply terminal of the interface control circuit 13 (e.g., the VCC pin of the interface control circuit chip U1 shown in FIGS. 1 and 2), ensuring fast communication reestablishment with high accuracy and reliability over a period of time from a power-off to the next power-on of the DALI bus.

Preferably, in one exemplary embodiment, when at the high level, the DALI bus voltage ranges from 9.5 V to 22.5 V. When at the low level, it is in the range of 0 V to 6.5 V. The time interval between the first and initial instants of time is 40 ms, and/or the time interval between the third and first instants of time is 2.4 ms. The time interval between the third and initial instants of time is not longer than 100 ms. It is to be noted that the present invention is not limited to any particular value of the time interval between the third and initial instants of time, and this time interval may be determined by a discharging period of the capacitor C1 that is connected in series with the power supply terminal of the interface control circuit 13 (e.g., the VCC pin of the interface control circuit chip U1 shown in FIGS. 1 and 2) and a power-off period of the DALI bus.

Figure 4:
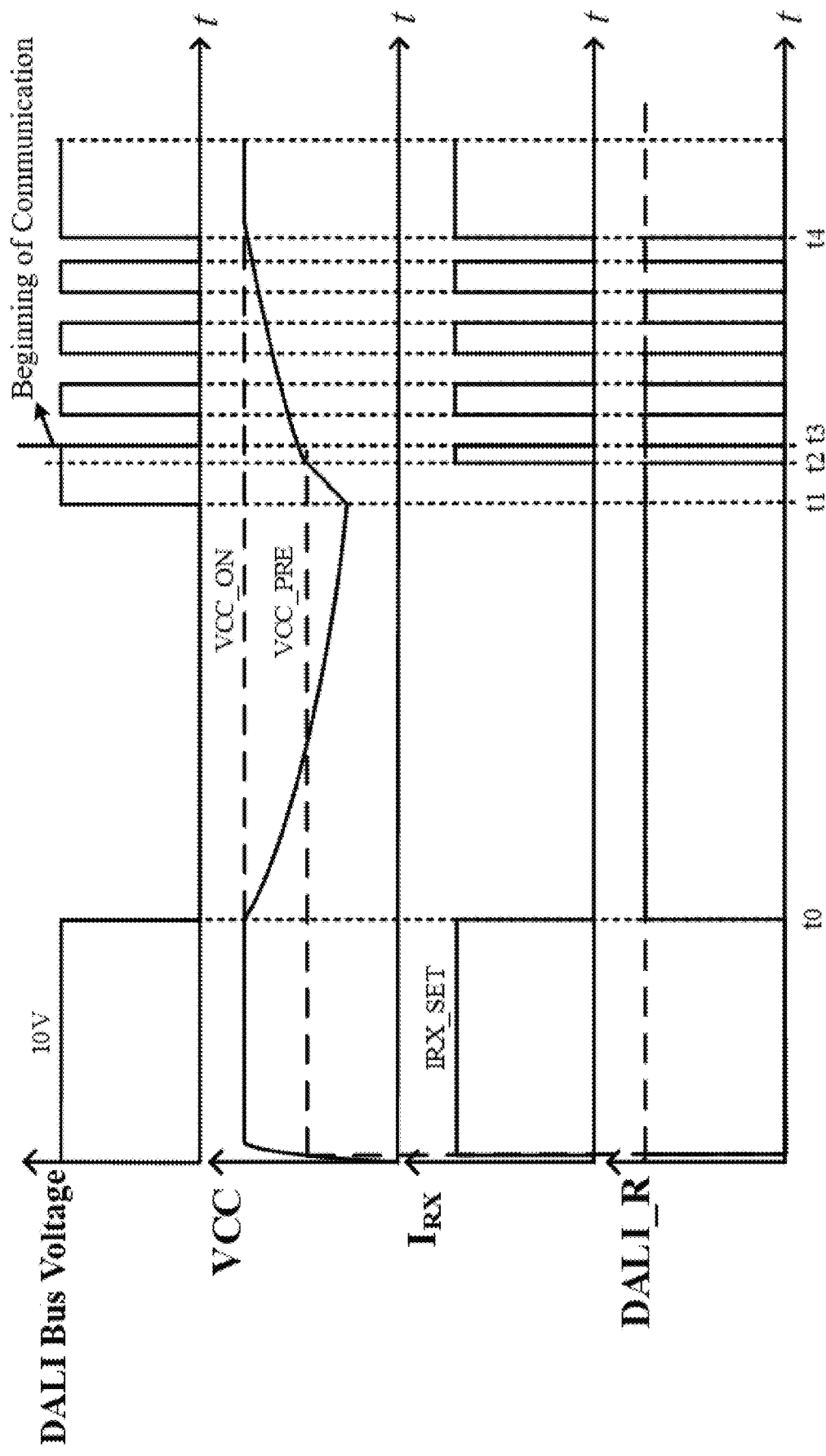
FIG. 4 shows exemplary waveforms involved in fast communication reestablishment over a period of time from a power-off to the next power-on of a low-voltage DALI bus in a control method for an interface control circuit according to the present invention.

In order to provide a better understanding of the present invention, a process for transmitting a DALI signal from the DALI bus 20 to the control unit 30 will be described in the context of a 10V DALI bus 20 as an example. Specifically, reference is now made to FIG. 4, a schematic diagram showing exemplary waveforms involved in fast communication reestablishment over a period of time from a power-off to the next power-on of the low-voltage DALI bus 20 in the inventive control method for the interface control circuit 13. As can be seen from FIG. 4, at the time t0, the 10V DALI bus 20 starts being pulled low from a high level for, for example, 40 ms. At this time, the capacitor C1 series-connected to the power supply terminal of the interface control circuit 13 starts being discharged, causing a drop in the voltage at the power supply terminal of the interface control circuit 13 (denoted as VCC in FIG. 4; the same applies to the following). At the time t1, the voltage on the 10V DALI bus 20 rises back to the high level and is then maintained at this level for, for example, 2.4 ms. At this time, the capacitor C1 series-connected to the power supply terminal of the interface control circuit 13 starts being rapidly charged, causing the voltage at VCC to rise until it reaches the pre-start voltage $V_{CC\_PRE}$ at the time t2. As a result, the DALI signal reception control module 131 is enabled, and the first switch element S1 is turned on by the pre-start module 1311 in the DALI signal reception control module 131, allowing normal operation of the DALI signal reception control module 131. At the time t3, the 2.4 ms interval when the 10V DALI bus 20 is maintained at the high level expires, and communication is established. Depending whether the signal from the DALI bus 20 is high or low, the DALI signal reception control module 131 turns on or off the first switch element S1. After being isolated by the receiver optocoupler U3, the DALI signal can be accurately received by the control unit 30. At a fourth instant of time, the voltage at VCC rises to the start voltage $V_{CC\_ON}$ as a result of an additional charging action. Thus, the normal operation can be achieved without requiring the voltage at VCC to rise to the start voltage $V_{CC\_ON}$. This enables fast communication reestablishment and avoids communication signal loss, achieving more accurate and more reliable communication.

It is to be also noted that, as discussed above, the interface control circuit 13 further includes the DALI signal transmitter module 132 including the second switch element S2. Preferably, in one exemplary embodiment, the control method further includes turning on or off the second switch element S2 according to the magnitude of a voltage of a received signal at the DALI signal transmitter module 132. The interface control circuit 13 of the present invention not only ensures that the control unit 30 can transmit a feedback signal to the DALI bus 20, but also has comprehensive protection functions as the overvoltage protection module 1322 additionally provides overvoltage protection.

Since the control method for the interface control circuit 13 provided in this embodiment achieves transmission of a feedback signal from the control unit 30 to the DALI bus 20 substantially in the same manner as the above-discussed interface control circuit 13, further description thereof is omitted here for the sake of brevity, and reference can be made to the above description for more details in this regard.

In summary, compared with the prior art, the interface control circuit, the control method and the interface control device of the present invention have the advantages as follows:

When the voltage at the power supply terminal of the interface control circuit reaches the pre-start voltage, the DALI signal reception control module is enabled to turn on or off the first switch element according to the magnitude of the DALI bus voltage. This enables rapid communication reestablishment between the DALI bus and the control unit over a period of time from a power-off to the next power-on of the DALI bus, thereby imparting improved accuracy and reliability to the communication between the DALI bus and the control unit and making the device accurate, reliable and simple in peripheral circuitry.

Since the interface control device incorporates the interface control circuit, it has all the advantages of the interface control circuit. Reference can be made to the above description for more details of the advantages of the interface control circuit. In addition, the input surge suppression circuit in the interface control device can suppress a surge that occurs immediately upon the activation of push button dimming, thereby effectively avoiding damage to the rectification circuit, the lighting device and other related devices that may be caused by the surge.

Since the control method is based on the same inventive concept as interface control circuit, it at least has all the advantages of the interface control circuit. Reference can be made to the above description for more details of the benefits of the interface control circuit, and further description thereof is omitted here for the sake of brevity.

Further, the various functional modules in the embodiments herein may be integrated into a discrete component, or provided as separate modules. Alternatively, two or more of the modules may be integrated into a discrete component.

The description presented above is merely that of a few preferred embodiments of the present invention and is not intended to limit the scope thereof in any sense. Any and all changes and modifications made by those of ordinary skill in the art based on the above teachings fall within the scope as defined in the appended claims. Apparently, those skilled in the art can make various modifications and variations to the present invention without departing from the spirit and scope thereof. Accordingly, the invention is intended to embrace all such modifications and variations if they fall within the scope of the appended claims and equivalents thereof.

What is claimed is:

1. An interface control circuit suitable for use in a dimming system compatible with both digital addressable lighting interface (DALI) dimming and push-button dimming, the interface control circuit comprising a DALI signal reception control module having a first switch element, the DALI signal reception control module configured to be enabled, when a voltage at a power supply terminal of the interface control circuit reaching a pre-start voltage, to turn on or off the first switch element according to a magnitude of a voltage on a DALI bus, wherein the pre-start voltage is lower than a start voltage of the interface control circuit, wherein the DALI signal reception control module further comprises a constant-current source, a pre-start module and an overvoltage and undervoltage protection module, wherein one end of the first switch element is series-connected to the constant-current source and then grounded, and the other end of the first switch element is connected to a signal reception terminal of the interface control circuit, and wherein an input terminal of the pre-start module is connected to the power supply terminal of the interface control circuit, an input terminal of the overvoltage and undervoltage protection module is connected to a voltage detection terminal of the interface control circuit, an output terminal of the pre-start module and an output terminal of the overvoltage and undervoltage protection module connected to each other and then to a control terminal of the first switch element.

2. The interface control circuit according to claim 1, wherein when a voltage received at the voltage detection terminal of the interface control circuit is higher than an upper voltage threshold or lower than a lower voltage threshold, the overvoltage and undervoltage protection module turns off the first switch element, and wherein when the voltage received at the voltage detection terminal of the interface control circuit lies between the upper voltage threshold and the lower voltage threshold, the overvoltage and undervoltage protection module turns on the first switch element.

3. The interface control circuit according to claim 1, further comprising a DALI signal transmitter module, the DALI signal transmitter module comprising a second switch element, a transmitter logic control module and an overvoltage protection module, one end of the second switch element connected to a drain terminal of the interface control circuit, the other end of the second switch element connected to a current detection terminal of the interface control circuit, an output terminal of the transmitter logic control module and an output terminal of the overvoltage protection module connected to each other and then to a control terminal of the second switch element, an input terminal of the transmitter logic control module connected to a signal transmission terminal of the interface control circuit, an input terminal of the overvoltage protection module and an input terminal of the overvoltage and undervoltage protection module both connected to the voltage detection terminal.

4. The interface control circuit according to claim 1, further comprising a chip power supply module, a first terminal of the chip power supply module connected to a high-voltage terminal of the interface control circuit, a second terminal of the chip power supply module and the input terminal of the pre-start module connected to each other and then to the power supply terminal of the interface control circuit, the power supply terminal of the interface control circuit series-connected to a capacitor and then grounded.

5. The interface control circuit according to claim 4, wherein in a period of time from a power-off to the next power-on of the DALI bus, the DALI signal reception control module is configured to:

at an initial instant of time when the voltage on the DALI bus starts being pulled low from a high level, turn off the first switch element and start discharging the capacitor;

at a first instant of time when the voltage on the DALI bus rises back to the high level, start charging the capacitor and, at a second instant of time when the voltage at the power supply terminal of the interface control circuit reaches or rises above the pre-start voltage, be enabled to turn on the first switch element; and at a third instant of time when the voltage on the DALI bus starts being pulled low from the high level, turn on or off the first switch element according to the magnitude of the voltage on the DALI bus.

6. The interface control circuit according to claim 5, wherein a time interval between the first and initial instants of time is 40 ms, and/or a time interval between the third and first instants of time is 2.4 ms.

7. The interface control circuit according to claim 1, the interface control circuit is integrated into an interface control circuit chip.

8. A control method for an interface control circuit, the interface control circuit suitable for use in a dimming system compatible with both digital addressable lighting interface (DALI) dimming and push-button dimming, the interface control circuit comprising a DALI signal reception control module having a first switch element, the control method comprising:
when a voltage at the power supply terminal of the interface control circuit reaches a pre-start voltage, enabling the DALI signal reception control module and turning on or off the first switch element according to a magnitude of a voltage on a DALI bus, wherein the pre-start voltage is lower than a start voltage of the interface control circuit,
wherein enabling the DALI signal reception control module when the voltage at the power supply terminal of the interface control circuit reaches the pre-start voltage comprises:
determining whether the voltage at the power supply terminal of the interface control circuit is equal to or higher than the pre-start voltage, and turning on the first switch element if the voltage at the power supply terminal of the interface control circuit is equal to or higher than the pre-start voltage.

9. The control method according to claim 8, further comprising:
determining whether a voltage at the voltage detection terminal of the interface control circuit is higher than an upper voltage threshold or lower than a lower voltage threshold, and turning off the first switch element if the voltage at the voltage detection terminal of the interface control circuit is higher than the upper voltage threshold or lower than the lower voltage threshold.

10. The control method according to claim 8, wherein in a period of time from a power-off to the next power-on of the DALI bus, the DALI signal reception control module operates to perform the steps of:
at an initial instant of time when the voltage on the DALI bus starts being pulled low from a high level, turning off the first switch element and starting discharging a capacitor, wherein the capacitor is series-connected to the power supply terminal of the interface control circuit and then grounded;
at a first instant of time when the voltage on the DALI bus rises back to the high level, starting charging the capacitor and, at a second instant of time when the voltage at the power supply terminal of the interface control circuit reaches or rises above the pre-start voltage, being enabled to turn on the first switch element; and
at a third instant of time when the voltage on the DALI bus starts being pulled low from the high level, turning on or off the first switch element according to the magnitude of the voltage on the DALI bus.

11. The control method according to claim 10, wherein the voltage on the DALI bus ranges from 9.5 V to 22.5 V when at the high level, and wherein the voltage on the DALI bus ranges from 0 V to 6.5 V when at a low level.

12. The control method according to claim 10, wherein a time interval between the first and initial instants of time is 40 ms, and/or a time interval between the third and first instants of time is 2.4 ms.

13. The control method according to claim 8, wherein the interface control circuit further comprises a DALI signal transmitter module, the DALI signal transmitter module comprising a second switch element, wherein
the control method further comprises:
turning on or off the second switch element according to the magnitude of a voltage of a signal received at the DALI signal transmitter module.

14. An interface control device, comprising a digital addressable lighting interface (DALI) bus, an input surge suppression circuit, a rectification circuit, the interface control circuit according to claim 1, a sampling circuit, a receiver optocoupler and a transmitter optocoupler,
the DALI bus connected to an input terminal of the input surge suppression circuit, an output terminal of the suppress surge circuit connected to the rectification circuit, a first output terminal of the rectification circuit connected to each of the sampling circuit, the high-voltage and drain terminals of the interface control circuit and a first input terminal of the receiver optocoupler, the sampling circuit connected to the voltage detection terminal of the interface control circuit, a second input terminal of the receiver optocoupler connected to the signal reception terminal of the interface control circuit, a first output terminal of the transmitter optocoupler connected to the signal transmission terminal of the interface control circuit, a second output terminal of the transmitter optocoupler grounded, a second output terminal of the rectification circuit grounded, an output terminal of the receiver optocoupler and an input terminal of the transmitter optocoupler configured to be connected to a control unit.

15. The interface control device according to claim 14, further comprising a constant-current circuit, a first terminal of the constant-current circuit connected to the first output terminal of the rectification circuit, a second terminal of the constant-current circuit connected to a third terminal of the constant-current circuit via a resistor, the third terminal of the constant-current circuit connected to the first input terminal of the receiver optocoupler.

* * * * *